United States Patent [19]

Plutschuck et al.

[11] Patent Number: 4,840,518
[45] Date of Patent: Jun. 20, 1989

[54] CUTTING INSERT

[75] Inventors: Lawrence Plutschuck; James E. Ochenski, both of Warren, Mich.

[73] Assignee: GTE Valenite Corporation, Troy, Mich.

[21] Appl. No.: 290,599

[22] Filed: Dec. 27, 1988

[51] Int. Cl.$^4$ ................................................ B23C 5/02
[52] U.S. Cl. ....................................... 407/113; 407/116
[58] Field of Search ............... 407/113, 114, 115, 116, 407/117

[56] References Cited

U.S. PATENT DOCUMENTS

| | | |
|---|---|---|
| 4,411,564 | 10/1983 | Johnson ................................ 407/113 |
| 4,566,827 | 1/1986 | Neumueller .......................... 407/113 |
| 4,659,264 | 4/1987 | Friedline .............................. 407/113 |
| 4,681,485 | 7/1987 | Koelewijn ............................ 407/113 |
| 4,693,641 | 9/1987 | Tsujimura ............................ 407/113 |
| 4,699,549 | 10/1987 | Shimomura .......................... 407/113 |
| 4,714,383 | 12/1987 | Shimomura .......................... 407/113 |

*Primary Examiner*—Frederick R. Schmidt
*Assistant Examiner*—Blynn Shideler
*Attorney, Agent, or Firm*—David J. Koris

[57] ABSTRACT

A disposable indexable cutting insert having opposed irregularly curved cutting edges and a smooth continuous transition along each cutting edge and a corresponding radiused corner edge.

13 Claims, 2 Drawing Sheets

CUTTING INSERT

BACKGROUND OF THE INVENTION

1. Field of the Invention

The present invention relates to a disposable indexable cutting insert, particularly to a cutting insert such as is adapted for being detachably mounted on a tool holder and for cutting a work piece. Cutting inserts of the present invention are generally made of a cemented metal carbide such as tungsten carbide and are formed by pressing techniques after which the pressed articles are sintered. The cutting insert of the present invention has been found to be particularly useful in the machining of titanium.

2. Description of the Prior Art

Disposable indexable cutting inserts are known in the art. Patents of general interest depicting such inserts include U.S. Pat. Nos. 4,411,564; 4,566,827; and 4,659,264. Another example in U.S. Pat. No. 4,681,485 wherein in FIGS. 6 to 8 a typical disposable indexable cutting insert is depicted which is particularly useful with an end mill cutting tool. The specific configuration and improved operating parameters of the insert of FIGS. 6 to 8 are discussed in detail in the U.S. Pat. No. 4,681,485 and will not be repeated herein except to note that such insert includes a curved cutting edge which increases the wear and life of the tool before it is necessary to index the insert. In addition, the opposed sides of the insert fall away from a respective cutting edge at an angle of about 30° to the vertical so that the sides can be firmly seated in a 60° conical seat formed in the cutter body. An effort to improve this insert has been made by including a 45° chamfer at the upper surface of the insert adjacent the sides contiguous to and between the cutting edges. However, the 45° chamfer creates an area of weakness in the form of a sharp corner at the intersection of the cutting edge and the 45° chamfered corner edge. In addition, a further area of weakness is provided by the 45° chamfer at 60° to the face of the cutting edge; that is, at a 60° included edge angle. Further, the 45° chamfer corrupts a portion of the cutting edge the effect of which is to decrease the length of the cutting edge.

It is highly desirable to provide an improved disposable indexable insert. It is also desirable to provide a relatively strong insert having a smooth continuous transition along a curved cutting edge between such edge and a radiused corner edge. It is further desirable to provide a relatively strong indexable insert by virtue of having a radiused corner edge at a relatively larger included edge angle. It is also desirable to increase the length of a curved cutting edge of an indexable insert.

SUMMARY OF THE INVENTION

This invention achieves these and other objects by providing a disposable indexable cutting insert having a cutting edge in the form of an irregular curve and a radiused corner edge. In particular, a cutting insert is provided comprising a bottom surface, a first side surface extending from the bottom surface and being in the form of a first curved plane which is concave relative to a vertical axis of the insert, and an opposite second side surface extending from the bottom surface and being in the form of a second curved plane which is also concave relative to such vertical axis. A first cutting edge face is provided which extends from the first side surface and away from the vertical axis to a first cutting edge. In a like manner, an opposite second cutting edge face is provided which extends from the second side surface and away from the vertical axis to a second cutting edge. A third side surface is provided which extends from the bottom surface between the first and second side surfaces, and an opposite fourth side surface is provided which extends from the bottom surface between the first and second side surfaces. In addition, a top surface extends from the first cutting edge to the second cutting edge in the form of a third curved plane which is concave relative to the bottom surface. The insert includes an upper first corner in the form of a fourth plane which is concave relative to the bottom surface and generally tangent to the top surface. In a like manner, a diagonally opposite upper second corner is provided in the form of a fifth plane which is concave relative to the bottom surface and generally tangent to the top surface. The top surface, upper first corner and first cutting edge face intersect to form the first cutting edge as a first irregular curve, and the top surface, upper second corner and second cutting edge face intersect to form the second cutting edge as a second irregular curve.

DESCRIPTION OF THE PREFERRED EMBODIMENT

Figure 1:
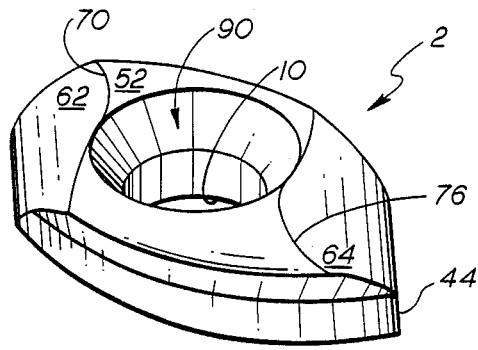
FIG. 1 is an elevated view of a cutting insert of the present invention.

The embodiment which is illustrated in FIGS. 1 to 4 is particularly suited for achieving the objects of the invention. FIGS. 1 to 4 depict a disposable indexable cutting insert 2 having a longitudinal axis 4, a vertical axis 6, and a horizontal axis 8. The insert 2 comprises a bottom surface 10 which is preferably planar. A first side surface 12 is provided. Side surface 12 extends vertically from bottom surface 10 to a first juncture 14. Side surface 12 lies in a first plane which forms a first regular curve 16 which is concave relative to axis 6. A second side surface 18 is provided opposite side surface 12. Side surface 18 extends vertically from bottom surface 10 to a second juncture 20. Side surface 18 lies in a second plane which forms a second regular curve 22 which is concave relative to axis 6. In the preferred embodiment the radii of curvature 24 and 26 of the first and second regular curves, respectively, are displaced relative to the intersection of axes 4 and 8, extending from, for example, positions 28 and 30, respectively. In the embodiment of FIGS. 1 to 4 such radii of curvature are about 0.335 inches, (for 0.375 i.c. insert).

Figure 2:
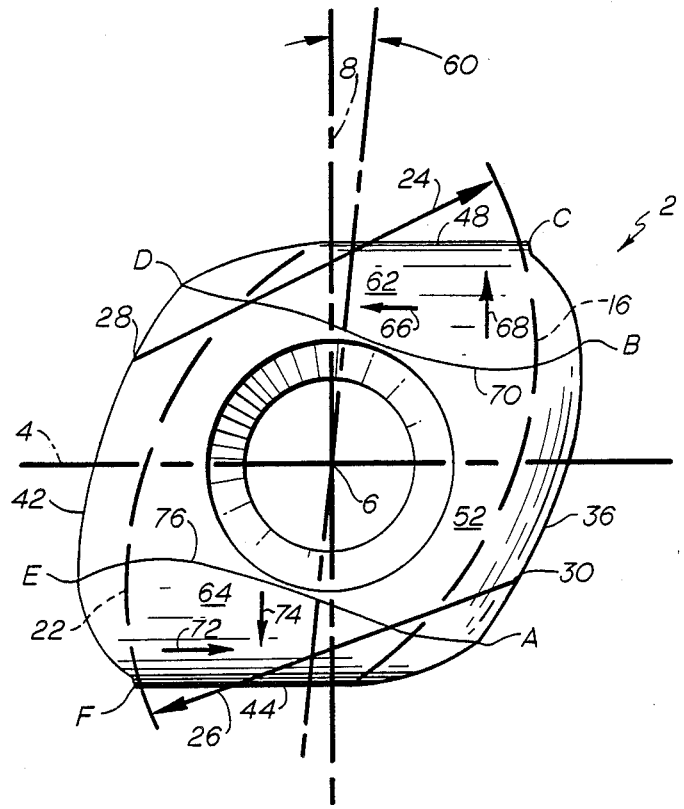
FIG. 2 is a plan view of the cutting insert of FIG. 1.
Figure 3:
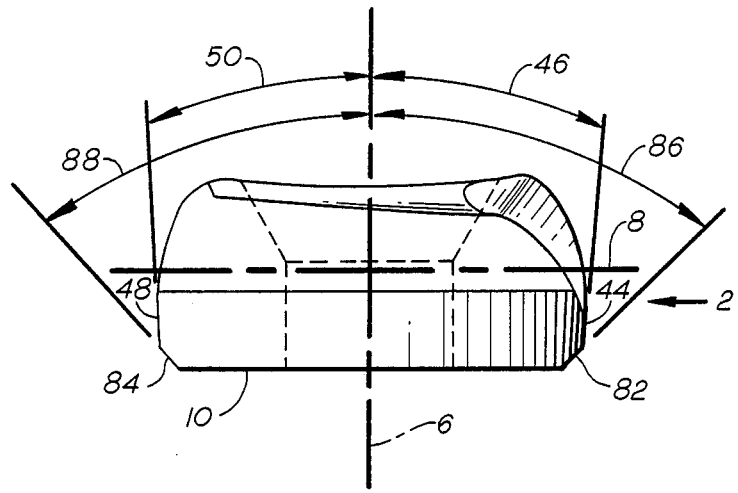
FIG. 3 is an end view of the cutting insert of FIG. 1.
Figure 4:
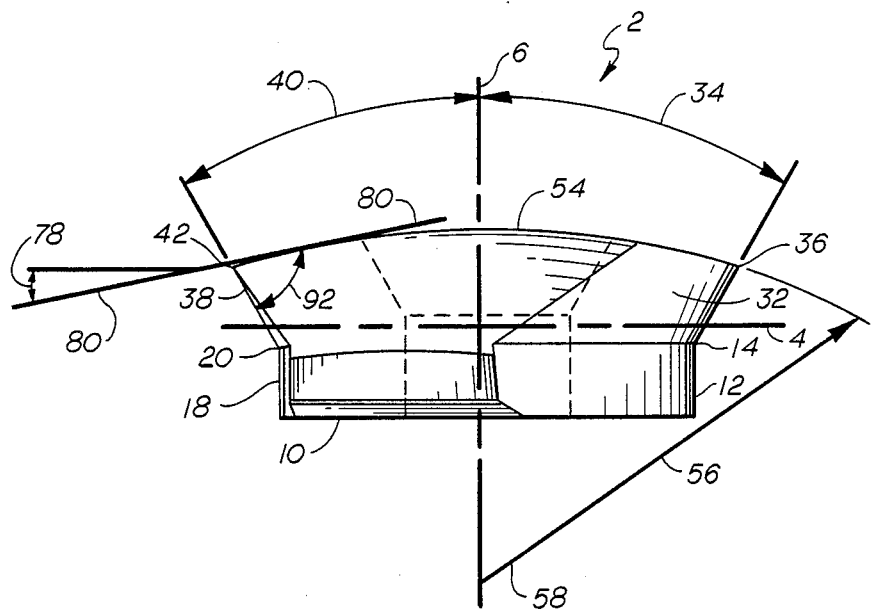
FIG. 4 is a side view of the cutting insert of FIG. 1.

Insert 2 includes a first cutting edge face 32 extending at a first angle 34 away from vertical axis 6. The first cutting edge face 32 extends from juncture 14 to a first cutting edge 36. In a like manner a second cutting edge 38 is provided which extends at a second angle 40 away from the vertical axis 6. The second angle 40 extends opposite to first angle 34 as depicted in FIG. 4. Second cutting edge face 38 extends from juncture 20 to a second cutting edge 42. In the embodiment of FIGS. 1 to 4, angles 34 and 40 are each about 30°.

A third side surface 44 is provided which extends from bottom surface 10 at a third angle 46 away from the vertical axis 6. In a like manner, a fourth side surface 48 is provided which extends from bottom surface 10 at a fourth angle 50 away from the vertical axis 6. The fourth angle 50 extends opposite to the third angle 46 as depicted in FIG. 3. In the embodiment of FIGS. 1 to 4, angles 46 and 50 are about 3° relative to axis 6 and about 93° relative to the base surface 10.

A top surface 52 extends from the first cutting edge 36 to the second cutting edge 42. Top surface 52 lies in a third plane which forms a third regular curve 54 which is concave relative to the bottom surface 10 as depicted in FIG. 4. In the preferred embodiment curve 54 has a radius of curvature 56 which extends from a point 58 at an angle 60 which is about 3° from axis 8. In the embodiment of FIGS. 1 to 4, radius of curvature 56 is about 0.800 inches, (for 0.375 i.c. insert).

Cutting insert 2 includes a first upper corner area 62 and a diagonally opposite second upper corner area 64. First upper corner area 62 generally extends upward relative to the bottom surface 10 in a first longitudinal direction designated by arrow 66 from the first cutting edge 36 towards the second cutting edge 42, and also extends in a first horizontal direction designated by arrow 68 from the top surfaee 52 down to the fourth side surface 48. The first upper corner area 62 lies in a plane best seen in FIG. 1 which is concave relative to the bottom surface 10 and which is generally tangent to the top surface 52 along the juncture generally designated 70. Similarly, the second upper corner area 64 generally extends upward relative to the bottom surface 10 in a second longitudinal direction designated by arrow 72 from the second cutting edge 42 towards the first cutting edge 36, and also extends in a second horizontal direction designated by arrow 74 from the top surface 52 down to the third surface 44. The second upper corner area 64 lies in a plane best seen in FIG. 1 which is concave relative to the bottom surface 10 and which is generally tangent to the surface 52 along the juncture generally designated 76. In the embodiment of FIGS. 1 to 4 the plane of the first upper corner area 62 and the plane of the second upper corner area 64 are also tangent to the fourth side surface 48 and third side surface 44, respectively, as best seen in FIG. 3 with respect to second upper corner 64 only. The concave plane of upper corner area 64 extends downward towards edge 42 at an angle 78 which is measured relative to (a) a tangent 80 to the plane of top surface 52, and (b) bottom surface 10. In a like manner, the concave plane of upper corner area 62 extends downward towards edge 36 at an angle which is measured similarly at the opposite edge of the insert relative to a tangent to the plane of the top surface 52, and bottom surface 10. In the embodiment of FIGS. 1 to 4, angle 78, and the corresponding angle for upper corner area 62, are each 10°. Upper corner area 64 can be perfected by orienting a grinder along the tangent 80 and moving such grinder through a radius of curvature which in the embodiment of FIGS. 1 to 4 is 0.125 inches. Upper corner area 62 can be perfected in a like manner at the opposite edge of the insert.

Cutting insert 2 includes a first beveled surface 82 which extends from bottom surface 10 to the third side surface 44, and a second beveled surface 84 which extends from bottom surface 10 to the fourth side surface 48. The surface 82 extends at an angle 86 away from vertical axis 6, and the surface 84 extends at an angle 88 away from vertical axis 6. Surfaces 82 and 84 extend away from each other, and in the embodiment of FIGS. 1 to 4 angles 86 and 88 are each 45°.

The top surface 52, the first upper corner area 62, and the first cutting edge face 32 intersect to provide first cutting edge 36 which is in the form of an irregular curve, formed by a first portion extending from A to B and a second portion extending from B to C. As depicted in FIG. 2, curve 36 is concave relative to vertical axis 6. In a like manner, the top surface 52, the upper second corner area 64, and the second cutting edge face 38 intersect to provide second cutting edge 42 which is also in the form of an irregular curve formed by a first portion extending from D to E and a second portion extending from E to F. Curve 42 is also concave relative to vertical axis 6.

The insert 2 includes a central opening 90 extending therethrough to facilitate positioning the insert in a tool holder such as an end mill cutting tool in a known manner.

The indexable cutting insert of the present invention provides an improvement over such inserts heretofore known. A relatively strong insert is provided having a smooth continuous transition between each curved cutting edge portion AB, DE and each adjacent radiused corner edge portion of the cutting edge at BC, EF, respectively. Strength of the insert of the present invention is also improved by virtue of having a radiused corner edge at a relatively larger included edge angle than heretofore known. In particular, in the embodiment of FIGS. 1 to 4 an included angle 92 of 70° is provided which adds to the strength of the insert. In addition, the length of the curved cutting edge is increased in that the upper corner area 62 and upper corner area 64 provides portions BC and EF of the cutting edges 36 and 42, respectively.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

We claim:

1. A cutting insert having a longitudinal axis, a vertical axis and a horizontal axis, comprising:
   a planar bottom surface;
   a first side surface extending vertically from said planar bottom surface to a first juncture and lying in a first plane which forms a first regular concave curve relative to said vertical axis;
   a second side surface opposite said first side surface and extending vertically from said planar bottom surface to a second juncture and lying in a second plane which forms a second regular concave curve relative to said vertical axis;
   a first cutting edge face extending at a first angle away from said vertical axis, said first cutting edge face extending from said first juncture to a first cutting edge;
   a second cutting edge face extending at a second angle opposite to said first angle and away from said vertical axis, said second cutting edge face extending from said second juncture to a second cutting edge;
   a third side surface extending at a third angle away from said vertical axis, said third side surface extending from said planar bottom surface;

a fourth side surface extending at a fourth angle opposite to said third angle and from said vertical axis, said fourth side surface extending from said planar bottom surface;

a top surface extending from said first cutting edge to said second cutting edge and lying in a third plane which forms a third regular concave curve relative to said planar bottom surface;

a first upper corner area generally extending angularly upward relative to said planar bottom surface in a first longitudinal direction from said first cutting edge towards said second cutting edge, and in a first horizontal direction from said top surface to said fourth side surface, said first upper corner area lying in a fourth plane which is concave relative to said planar bottom surface and which is generally tangent to said top surface;

a diagonally opposite second upper corner area generally extending upward relative to said bottom surface in a second longitudinal direction opposite said first longitudinal direction from said second cutting edge towards said first cutting edge, and in a second horizontal direction from said top surface to said third side surface, said second upper corner area lying in a fifth plane which is concave relative to said planar bottom surface and which is generally tangent to said top surface;

said top surface, said first upper corner area and said first cutting edge face intersecting to form said first cutting edge as a first irregular curve concave relative to said vertical axis, and said top surface, said second upper corner area, and said second cutting edge face intersecting to form said second cutting edge as a second irregular curve concave relative to said vertical axis.

2. The cutting insert of claim 1 wherein said first angle and said second angle are each 30°.

3. The cutting insert of claim 2 wherein said third angle and said fourth angle are each 3°.

4. The cutting insert of claim 3 wherein said fourth plane extends downward towards said first cutting edge at a fifth angle which is measured relative to (a) a first tangent to said third plane, and (b) said bottom surface, and wherein said fifth plane extends downward towards said second cutting edge at a sixth angle which is measured relative to (a) a second tangent to said third plane, and (b) said bottom surface.

5. The cutting insert of claim 4 wherein said fifth angle and said sixth angle are each 10°.

6. The cutting insert of claim 5 wherein said third regular concave curve has a first radius of curvature which is about 3° from said horizontal axis.

7. The cutting insert of claim 6 wherein said fourth plane is concave relative to a second radius of curvature of 0.125 inches and said fifth plane is concave relative to a third radius of curvature of 0.125 inches.

8. The cutting insert of claim 7 wherein said first radius of curvature is about 0.800 inches.

9. The cutting insert of claim 8 wherein said first regular concave curve has a fourth radius of curvature of 0.335 inches and said second regular concave curve has a fifth radius of curvature of 0.335 inches.

10. The cutting insert of claim 4 wherein said fourth plane is also generally tangent to said fourth side surface, and said fifth plane is also generally tangent to said third side surface.

11. The cutting insert of claim 1 further including a first beveled surface extending from said planar bottom surface to said third side surface, and a second beveled surface extending from said planar bottom surface to said fourth side surface.

12. The cutting insert of claim 11 wherein said first beveled surface extends at a seventh angle away from said vertical axis, said second beveled surface extends at an eighth angle away from said vertical axis, and said seventh and eighth angles are each 45°.

13. A cutting insert, comprising:

a bottom surface;

a first side surface extending from said bottom surface and being in the form of a first curved plane concave relative to a vertical axis of said insert;

an opposite second side surface extending from said bottom surface and being in the form of a second curved plane concave relative to said vertical axis;

a first cutting edge face extending from said first side surface and away from said vertical axis to a first cutting edge;

an opposite second cutting edge face extending from said second side surface and away from said vertical axis to a second cutting edge;

a third side surface extending from said bottom surface between said first and second side surfaces;

an opposite fourth side surface extending from said bottom surface between said first and second side surfaces;

a top surface extending from said first cutting edge to said second cutting edge in the form of a third curved plane concave relative to said bottom surface;

an upper first corner in the form of a fourth curved plane concave relative to said bottom surface and generally tangent to said top surface;

a diagonally opposite upper second corner in the form of a fifth curved plane concave relative to said bottom surface and generally tangent to said top surface, said top surface, said upper first corner and said first cutting edge face intersecting to form said first cutting edge as a first irregular curve, and said top surface, said upper second corner and said second cutting edge face intersecting to form said second cutting edge as a second irregular curve.

* * * * *